United States Patent
McGuire

(10) Patent No.: US 8,166,189 B1
(45) Date of Patent: Apr. 24, 2012

(54) CLICK STREAM INSERTIONS

(75) Inventor: Russell S. McGuire, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 385 days.

(21) Appl. No.: 12/055,043

(22) Filed: Mar. 25, 2008

(51) Int. Cl.
G06F 15/16 (2006.01)

(52) U.S. Cl. .......................... 709/231; 709/217

(58) Field of Classification Search .................. None
See application file for complete search history.

(56) References Cited

U.S. PATENT DOCUMENTS

| | | | | |
|---|---|---|---|---|
| 5,758,194 | A * | 5/1998 | Kuzma | 710/66 |
| 6,304,914 | B1 * | 10/2001 | Deo et al. | 709/247 |
| 6,308,327 | B1 | 10/2001 | Liu | |
| 6,412,011 | B1 * | 6/2002 | Agraharam et al. | 709/231 |
| 6,571,279 | B1 * | 5/2003 | Herz et al. | 709/217 |
| 6,647,257 | B2 | 11/2003 | Owensby | |
| 6,845,399 | B2 * | 1/2005 | Agraharam et al. | 709/231 |
| 6,980,972 | B1 * | 12/2005 | Allibhoy et al. | 705/51 |
| 7,100,111 | B2 | 8/2006 | McElfresh | |
| 7,386,512 | B1 * | 6/2008 | Allibhoy et al. | 705/51 |
| 7,401,115 | B1 * | 7/2008 | Arsenault | 709/203 |
| 7,426,558 | B1 * | 9/2008 | Allibhoy et al. | 709/224 |
| 2001/0048683 | A1 * | 12/2001 | Allan et al. | 370/395.21 |
| 2002/0173973 | A1 * | 11/2002 | Cirinna et al. | 705/1 |
| 2003/0167467 | A1 * | 9/2003 | Allen et al. | 725/47 |
| 2005/0240580 | A1 * | 10/2005 | Zamir et al. | 707/4 |
| 2006/0075139 | A1 * | 4/2006 | Jungck | 709/245 |
| 2007/0079007 | A1 * | 4/2007 | Sethi et al. | 709/246 |
| 2007/0226614 | A1 * | 9/2007 | Lorenzen et al. | 715/530 |
| 2008/0304518 | A1 * | 12/2008 | Cheng et al. | 370/474 |
| 2009/0182622 | A1 * | 7/2009 | Agarwal et al. | 705/10 |
| 2010/0076955 | A1 * | 3/2010 | Van Steenbergen et al. | 707/711 |
| 2010/0257413 | A1 * | 10/2010 | Brunet et al. | 714/57 |
| 2010/0281105 | A1 * | 11/2010 | Sebastian | 709/203 |
| 2010/0293217 | A1 * | 11/2010 | Srinivasan et al. | 709/202 |

* cited by examiner

Primary Examiner — Bunjob Jaroenchonwanit

(57) ABSTRACT

A method and medium are provided for augmenting content to be communicated to a user. The method can include receiving original content from a server; determining the extent to which augmentative content should be provided; determining contextually relevant augmentative content to be provided based, at least in part, on click-stream data associated with the user and other attributes associated with the user; augmenting the original content with the augmentative content; and communicating the augmented content to the user.

8 Claims, 5 Drawing Sheets

CLICK STREAM INSERTIONS

SUMMARY

Embodiments of the present invention are defined by the claims below. But summarily, embodiments provide a way to augment content to be communicated to users so as to enhance the experience of the user. According to embodiments of the invention, content may be augmented by a service provider such as, for example, an internet service provider (ISP) or a mobile network operators (MNO).

In a first illustrative aspect, a set of computer-useable instructions provides a method of augmenting content to be communicated to a user. One embodiment of the method includes receiving original content that is being provided from a content provider in response to a query from a user; determining the extent to which augmentative content should be provided; referencing click-stream data and profile data associated with the user; determining augmentative content; creating augmented content; and communicating the augmented content to the user.

In a second illustrative aspect, a set of computer-useable instructions provides a method of augmenting content to be communicated to a user. One embodiment of the method includes monitoring at least a portion of a user's network activity; compiling click-stream data associated with the user; intercepting a user request for content; intercepting a response that includes original content communicated from a content provider; and augmenting the original content based, at least in part, on the compiled click-stream data.

In a final illustrative aspect, a set of computer-useable instructions provides a method of creating augmented content that is contextually relevant to a user by augmenting content to be communicated to the user. One embodiment of the method includes receiving an indication from a content provider to augment original content; referencing augmentation preferences associated with a plurality of users; referencing click-stream data associated with each of the plurality of users; and augmenting the original content based, at least in part, on the indication received from the content provider, the augmentation preferences, and the click-stream data.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
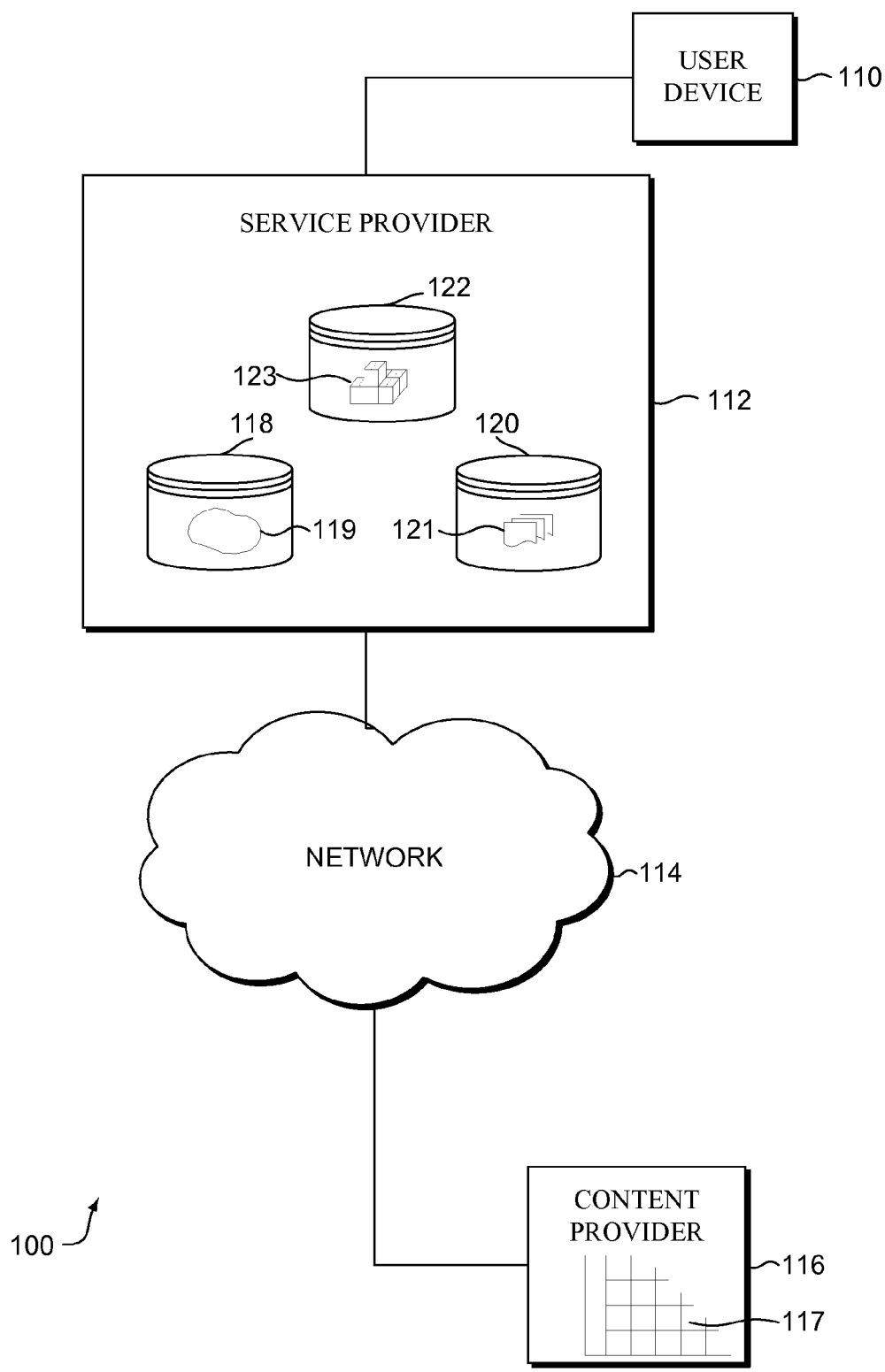
FIG. 1 is a block diagram illustrating an exemplary networking environment suitable for implementing various embodiments of the present invention.

With reference to FIG. 1, an exemplary networking environment 100 suitable for implementing various embodiments of the present invention is shown. Networking environment 100 may include a user device 110, a service provider 112, and a content provider 116, all of which may communicate via network 114. User device 110 and/or content provider 116 may further be connected to network 114 via other networks such as, for example, a local area network (LAN), a wide area network (WAN), or a wireless telecommunications network. Networking environment 100 is merely an example of one suitable networking environment and is not intended to suggest any limitation as to the scope of use or functionality of the present invention. Neither should networking environment 100 be interpreted as having any dependency or requirement related to any single component or combination of components illustrated therein.

User device 110 may be any type of computing device such as, for example, a computer or other machine, such as a personal data assistant or other handheld device. The invention may be practiced in a variety of system configurations, including hand-held devices, consumer electronics, general-purpose computers, more specialty computing devices, communication devices, mobile communications devices, etc.

In some embodiments, user device 110 has the capability of identifying its geographic location. That is, the device may have location awareness. This capability allows a user device 110 to identify its location on every network to which the user device 110 is connected. The user device 110 may also transmit information identifying its geographic location to other components of the network. For example, user device 110 may be able to transmit information identifying its geographic location to service provider 112 or to content provider 116. Additionally, in various embodiments, the location of user device 110 may be determined by other network components such as those illustrated in FIG. 1. For example, service provider 112 may be able to determine the geographic location of user device 110.

User device 110 may be connected to network 114 by way of a service provider 112 which may include a server computer device operated by a service provider such as a wireless telecommunications carrier, mobile network operator (MNO), or internet service provider (ISP). Service provider 112 may help facilitate the communication of content from either a third party or from a service provider to user device 110. As will be explained in greater detail below, service provider 112 may perform additional functions such as, for example, generating or modifying content to be communicated to user device 110. In an embodiment, service provider 112 may include two or more servers that may be directly or indirectly connected to each other without using network 114. In another embodiment, service provider 112 may include only a single server. As one skilled in the art will appreciate service provider 112 may in actuality include any number of servers in communication. For example, in one embodiment service provider 112 may actually include a bank of servers.

As shown in FIG. 1, service provider 112 may include searchable databases 118, 120, and 122. For example, in an embodiment, service provider 112 may include a first database 118 for storing click-stream data 119 associated with a user of user device 110. Click-stream data 119, which is typically only available to service providers, may include information related to a user's network activity. For example, click-stream data 119 may include information related to a user's communications over a network such as network 114. A user's communications, in this regard, may include any transfers of information or signaling, the latter of which will be recognized by one skilled in the art as exchanges of information used to facilitate establishment of communications connections.

In an embodiment of the present invention, click-stream data 119 may include indications of every "click" a user has made while in communication over a network such as network 114. As used herein throughout, the term "click" is intended to encompass not only the traditional notion of a click, which may be a user input made by activating a button disposed on a mouse, but is also intended to encompass any user input or action taken by a user that results in a communication over a network. For example, click-stream data 119 may include such information as indications of each website a user has visited, each query a user has entered, and each link a user has selected.

In various embodiments, the click-stream data 119 stored in database 118 is indexed. That is to say that each instance of click-stream data 119 in database 118 is associated with either a user or a user device 110. As will be readily appreciated by those skilled in the art, user device 110 may be operated exclusively by a single user in one embodiment. In other embodiments, user device 110 may be operated, typically at different times, by more than one user. For example, a family desktop computer may be shared by several family members, using one or more different accounts at different times. Similarly, a mobile phone may be issued to a particular subscriber to a mobile phone service, and that subscriber may be the usual user of the device. On some occasions, however, the subscriber may let others borrow the mobile phone. In an embodiment, click-stream data 119 is associated with the user device 110, regardless of the user. In another embodiment, click-stream data 119 is associated with a particular user, regardless of the user device 110.

In an embodiment of the present invention, a given instance of click-stream data 119 may include, for example, information indicating the user or device with which the instance of click-stream data 119 is associated, e.g., whose actions generated the click-stream data 119, information relating to the type of action that was taken, information relating to the communications made in connection with that action, and the date and time that the action was taken.

For example, a user may use his or her user device to search for content. Click-stream data associated with this activity may include information identifying the user and the device that is being used. Such click-stream data may further include information indicating that the user opened a web browser at a certain time of day on a certain date. The click-stream data may further track the user's actions, for example, by containing information that the user accessed a home page at, for example, 9:44 pm on Jan. 14, 2008. The click-stream data may further indicate that the user entered a uniform resource locator (URL) such as "www.searchcontent.com" at 9:45 pm. Such click-stream data may further describe, for example, a particular search that the user made and any content that the user received. Click stream data may also include information identifying actions that a user took after completing a search such as, for example, whether the user quickly abandoned the search, performed a follow-up search, or completed a sales transaction.

With continuing reference to FIG. 1, service provider 112 may also include a database 120 for storing profiles 121 associated with various users. A profile 121 may contain any type of information related to a user, including information that is only available to a service provider. In one embodiment, a profile 121 may contain demographic information related to a user such, for example, age, gender, address, name, etc. In another embodiment, a profile 121 may contain financial information such as, for example, details regarding a user's service bill or a user's credit score. In other embodiments, a profile 121 may contain information related to a user's social or economic relationships such as, for example, employers, family members, and memberships in other organizations. In further embodiments, a profile 121 may contain information related to a user's current network connectivity such as, for example, the speed of a user's network connection.

In still further embodiments, a profile 121 may contain user preferences related to services and communications such as information indicating whether a user wishes to receive certain types of content, including augmented content as discussed herein. Additionally, a profile 121 may contain references to various business rules established by the service provider 112, which may be based on user preferences, service provider objectives, content provider requests or various combinations thereof.

In some embodiments, business rules may vary depending on the type of service plan a user subscribes to. For example, in one embodiment, a business rule may indicate that a user who subscribes to an inexpensive basic service plan is to receive augmented content regardless of the user's preferences. On the other hand, in an embodiment, a business rule may indicate that a user who subscribes to a more expensive, e.g. "premium", plan may have more control over the types of content that the user receives. Other embodiments may include business rules that specify that a particular user should receive augmentative content only in response to a request for a certain type of original content, a certain instance of original content, or original content from a certain content provider. As will be readily appreciated by those skilled in the art, business rules may be configured in any number of manners and may be configured to further the objectives of the service provider, the user, the content provider, or any other interested party.

In still further embodiments, a profile 121 may contain information relating to a user's network behavior such as, for example, histories of communications, or various other types of information. Information stored in a profile 121 in database 120 may be provided by a user, by a network administrator, by a service provider, by a computer program, or by any other means of generating information that can be associated with a particular user.

As shown in FIG. 1, service provider 112 may also include a database 122 for storing augmentative content 123. As used herein, augmentative content 123 generally refers to any content that may be used to enhance, or augment, some original content that is to be communicated to a user. Augmentative content 123, which may be stored in database 122, may include any type of content that can be communicated to a user such as documents, links to websites, video files, audio files, applications, scripts, text, etc. In some embodiments, augmentative content 123 may, for example, include streaming media such as streaming video or streaming audio.

In an embodiment of the present invention, augmentative content 123 may be contextually relevant to a user and may be based on any combination of any number of various attributes associated with the user. For example, augmentative content 123 may be relevant to a user's historical networking patterns, recent networking actions, current connectivity, historical actions with respect to certain content, etc. In some embodiments, augmentative content 123 may be relevant to a user's current context such as the user's current or historical geographical location and the time of day in that geographical location. In further embodiments, augmentative content 123 may be relevant to various other attributes of a user, such as any of the types of information described above with reference to user profiles. Additionally, augmentative content 123 may be relevant to original content which is augmented by the augmentative content 123.

In an embodiment of the present invention, augmentative content may be relevant to a user based on click-stream data associated with the user. For example, click-stream data associated with a particular user may indicate patterns of network activity that suggest trends, interests, common queries, eCommerce transactions, and the like. These types of information may be used by a service provider to provide augmentative content to a user that the user may be likely to enjoy or to which the user may be likely to respond. Augmentative content may be contextually relevant to a user in any number of ways and, according to an implementation of the present invention, that relevance may be enhanced due to the unique access that a service provider has to a user's click-stream data, as well as private and confidential information associated with a user.

For example, consider the illustrative case of ISP subscriber Alph. Click-stream data associated with Alph may, for example, indicate that Alph frequently looks up NBA scores online. Additionally, Alph's profile may indicate that he lives in Chicago and has family and business contacts in Boston. The ISP server through which Alph receives networking service may further be able to determine that at 8:00 pm on Monday, Alph is in Chicago at a store that is located next door to Bob's Coffee Shoppe. Suppose Alph uses his mobile phone at 8:00 pm on Monday to request content from the ESPN® website. Based on that request and other attributes such as, for example, Alph's location, click-stream data, and profile data, the ISP may augment the content Alph receives in response to his request with augmentative content such as, for example, the most recent Chicago Bulls scores and statistics. The ISP may also include the most recent Boston Celtics scores since Alph has family and business contacts in Boston. Moreover, the ISP may further include an electronic coupon or advertisement to Bob's Coffee Shoppe based on Alph's location.

Now, suppose Alph is using his desktop computer or laptop computer on Tuesday at 5:00 p.m. Further suppose that, in the example above, Alph clicked on the electronic coupon to Bob's Coffee Shoppe. That action may have been recorded by Alph's ISP as part of a set of click-stream data associated with Alph. Now, as Alph uses his computer on Tuesday at 5:00 p.m., the ISP server may augment a set of search results to be communicated to Alph. Based on the new click-stream data from above, the ISP may send Alph a registration form for signing up to be in Bob's Coffee Shoppe VIP club. Additionally, the ISP may send Alph an advertisement for an NBA game that will start at 5:30 p.m. These scenarios are but a few of a myriad of scenarios possible with implementation of embodiments of the present invention.

With continued reference to FIG. 1, in one embodiment, augmentative content 123 may include reference content, which may include various instances of access to further augmentative content. For example, a content provider 116 may provide links to certain instances of augmentative content to the service provider 112. These links may be stored in database 122 as augmentative content 123. The links can then be followed, when appropriate, to access augmentative content which can be used to augment original content to be communicated to a user. In one embodiment, links to augmentative content may include links to websites or links to particular files such as, for example, video files, audio files, or advertisement files. In another embodiment, links to augmentative content may include links to dynamic media, such as real-time stock quotes, sports scores, blogs, news providers, or other continuously updated content sources. In various embodiments, augmentative content may include links to other service providers. In other embodiments, database 122 may have stored therein actual content which may be used to augment content to be communicated to a user.

In an embodiment of the present invention, augmentative content 123 includes advertisements such as banner advertisements, video advertisements, audio advertisements, and textual or visual advertisements. In another embodiment, augmentative content 123 includes executable scripts that can be used to augment content. In this case, once the augmented content 123 is accessed by a user, an executable script may be executed by the user's device. Augmentative scripts may cause the user device to retrieve further content from, for example, service provider 112, content provider 116, or some other entity. In other embodiments, executable scripts may generate additional content or functionality at the user device 110. For example, in an embodiment, an augmentative script may make a query to another server or content provider, and in a further embodiment, an augmentative script may cause the user's web browser to retrieve content or search for content.

In still a further embodiment, an augmentative script may be operable to generate functional content. Functional content may include content that comprises output from a function that is designed to modify or organize original content to enhance the relevance of the original content to a user. Additionally, in other embodiments, content from a content provider 116 may be modified or organized at the service provider 112 by utilizing functions, applications, or programs internal to service provider 112. Modifications may include, for example narrowing of search results to be more relevant to a user, ranking of content such as search results according to relevance to a user, and filtering of content to emphasize features of the content that are the most relevant to a user. In various embodiments, modifications to content may also be effected by a service provider 112 in response to a business rule, user preference, or content provider request.

In various embodiments of the present invention, augmentative content 123 may include information related to a user's services or subscription to services. Augmentative content 123 may even include a bill for services or links to other similar financial information. In further embodiments, augmentative content 123 may include information related to the content augmentation services provided by the service provider 112 and in some embodiments, may include functionality that enables a user to exercise some amount of control in that regard. For example, augmentative content 123 may include functionality that allows a user to input information or a selection between various options presented to the user.

In one embodiment, this functionality includes presenting an option to a user of whether the user wishes to receive augmentative content in the future. A user may, for example, be able to select a preference such as by selecting a "YES" button or a "NO" button. In various embodiments, this functionality may take any of various forms known in the art and may be configured to achieve service provider, user, and/or content provider objectives. For example, in an embodiment, a user may be provided with an option to edit a profile associated with the user. In a further embodiment, a user may be presented with an option to submit preferences for various other contexts. It will be appreciated by those skilled in the art that any type of option associated with a user's desired settings may be presented to the user within the functionality described herein.

With continued reference to FIG. 1, service provider 112 has access to the network 114, which in turn provides access to content provider 116 in one embodiment.

Content provider 116 has media content 117 available to be experienced. In one embodiment of the present invention, a user can utilize user device 110 to locate content 117 and convey an indication of a desire to receive that content 117. Content provider 116 can then communicate all of or a portion of the content 117 over a communications channel established with user device 110 so that a user can experience the content 117. A user may experience content 117 in various ways, for example, by previewing content 117, downloading content 117 or purchasing content 117. It will be readily appreciated by those skilled in the art that content 117 may take many different forms such as HTML documents, video files (e.g. MPEG), audio files (e.g. MP3), graphics files (e.g. JPEG), text, streaming media (e.g. streaming audio or video), search results (e.g. lists of results), links to other content or websites, etc.

Figure 5:
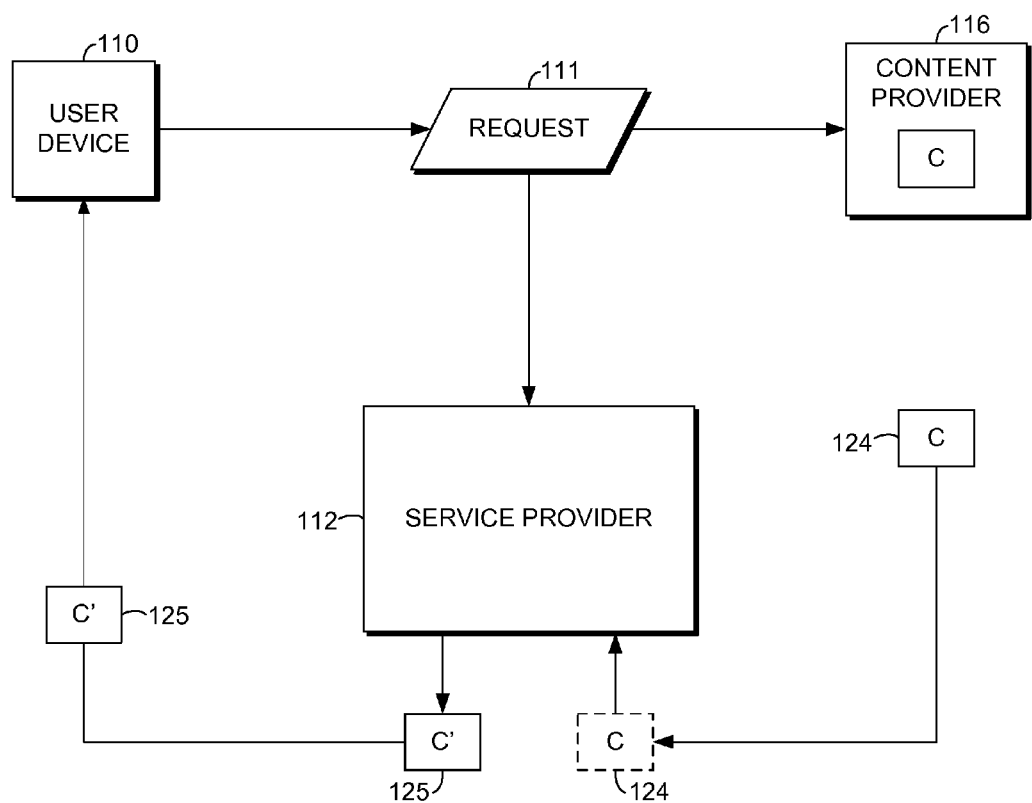
FIG. 5 is a schematic diagram illustrating an exemplary process of augmenting content in accordance with an embodiment of the present invention.

Turning briefly to FIG. 5, a schematic diagram illustrating an exemplary process of augmenting content in accordance with an embodiment of the present invention is shown. As illustrated in FIG. 5, the user device 110 may transmit a request 111 for content 123 to a content provider 116. A request 111, as used herein, may include a communication requesting particular content, a query, one or more search instructions for performing a search, or any other communication to which a content provider may respond by providing content. A request 111 from a user device 110 may be completely transparent to a service provider 112. The service provider 112 may be able to monitor, collect, compile, store, and/or view information relating to any communication, including a request 111 that a user makes using a device 110 that is connected to a network through the service provider 112.

As shown in FIG. 5, the service provider 112 may intercept the request 111 by making a copy of the request 111 before further transmitting the request 111 to the content provider 116. As illustrated, the content provider 116 has content 124 that may be responsive to the request 111. After making a copy of the request 111, the service provider 112 may, in an embodiment, begin to make decisions regarding augmenting any content that may be returned in response to the request 111. These decisions may be based upon, for example, the request 111 or any other information the service provider 112 has regarding the user device 110, the user, or the content provider 116.

As further illustrated in FIG. 5, the content provider 116 receives the request 111, and, in response, provides content 124. Before the content 124 reaches the user device 110, the service provider 112 intercepts the content 124. In various embodiments of the present invention, because the service provider 112 provides the networking service to a user device 110, any communications, including content 124, that pass to or from the user device 110 may pass through the service provider 112. As will be further understood in light of the following explanations, the service provider 112 augments the original content 124 to create augmented content 125, as described herein. The augmented content 125 is then communicated to the user device 110, as shown in FIG. 5.

Figure 2:
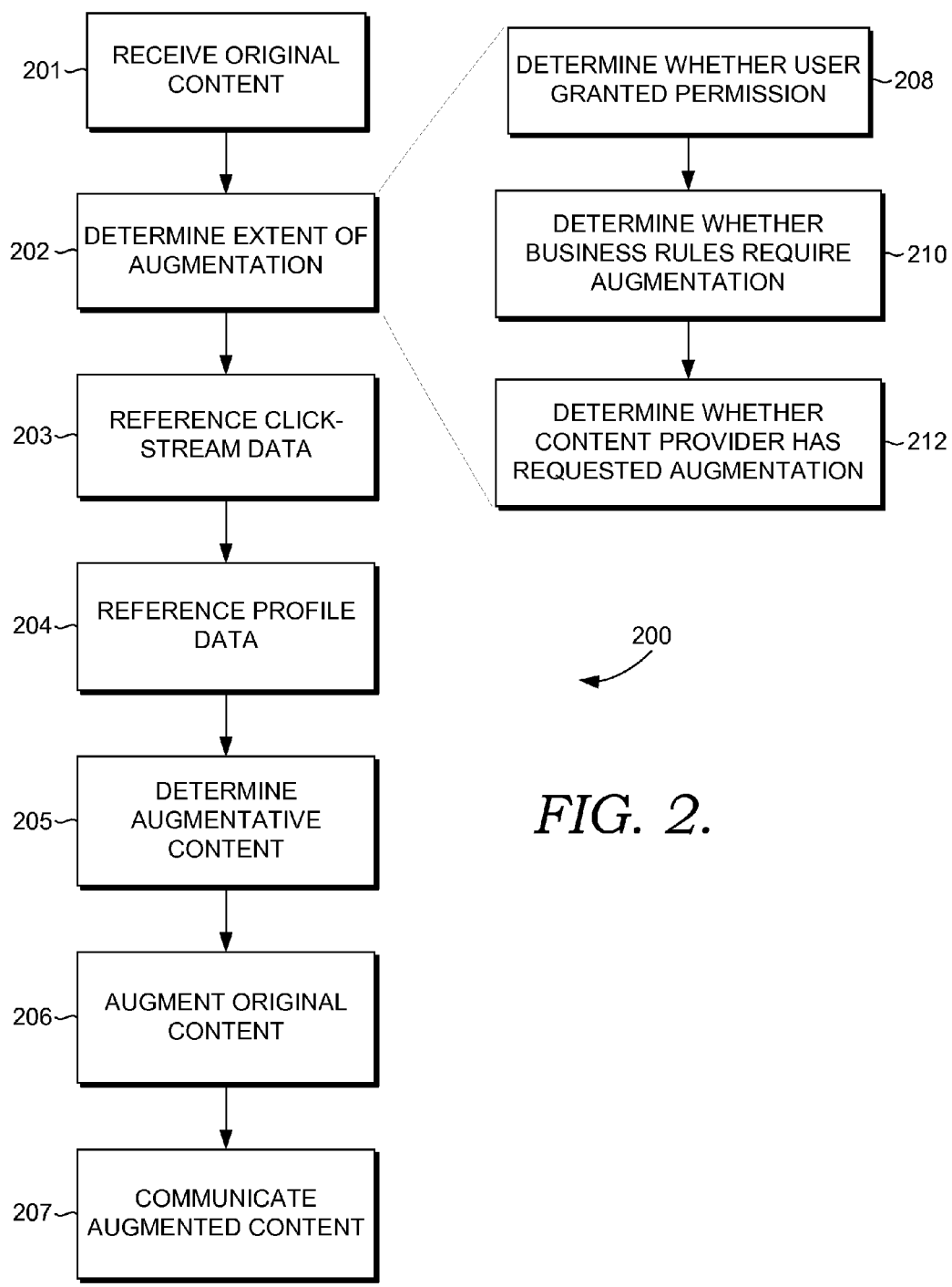
FIG. 2 is a flow diagram illustrating an exemplary method of augmenting content to be communicated to a user according to an embodiment of the present invention.
Figure 3:
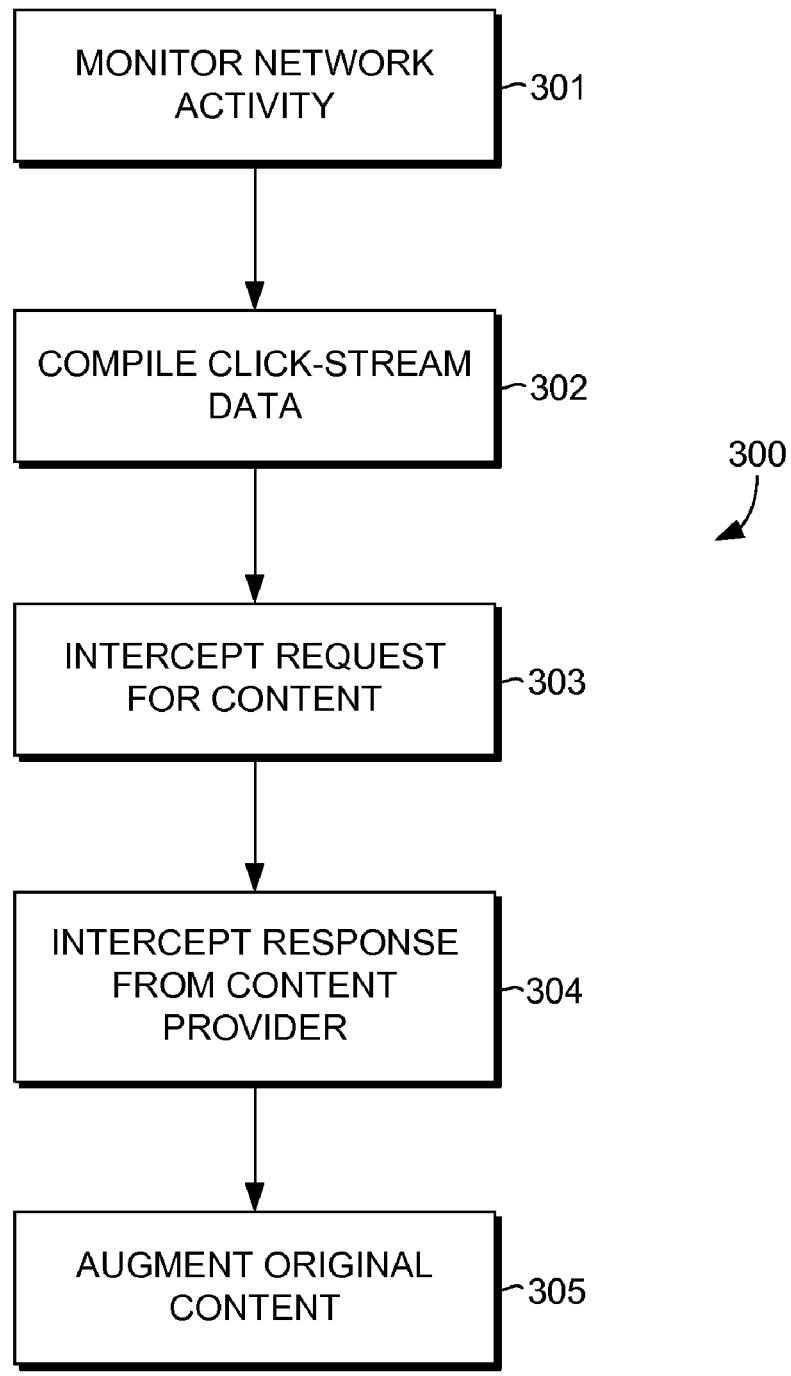
FIG. 3 is a flow diagram illustrating an exemplary method of augmenting content to be communicated to a user according to an embodiment of the present invention.

Turning now to FIG. 3, a flow diagram illustrating an exemplary method for practicing an embodiment of the present invention is provided. At step 201, original content is received from a content provider. As used herein, "original" content simply refers to any content provided by a content provider. In some embodiments, original content may be exactly the content that a user has requested. In other embodiments, original content may be content that a content provider has provided in response to a user query or request and in still further embodiments, original content may be provided to a user regardless of whether a user has requested content (e.g. unsolicited advertisements). Original content that is to be communicated to a user may be received, as illustrated at step 201 of FIG. 2, by a service provider.

At a step 202, the service provider determines the extent to which augmentative content should be provided to the user. A service provider may determine whether augmentative content should be provided to a user and/or how much augmentative content should be provided to a user. To make this determination, in one embodiment, the service provider may determine, in part, whether the user has granted permission to the service provider to provide augmentative content to the user. For example, a user may expressly grant permission to a service provider such as, for example, by indicating permission in a communication, on an application for service, or at any other time and in any other manner acceptable to the service provider. In another embodiment, a user may grant such permission impliedly, for example by accepting augmentative content from the service provider. In still further embodiments, a user may impliedly grant permission by failing to inform the service provider that the user does not wish to receive augmentative content.

In another embodiment of the present invention, a service provider may determine the extent to which augmentative content should be provided to a user, in part, by determining whether a business rule requires providing augmentative content to the user. In a further embodiment of the present invention, a carrier may determine the extent to which augmentative content should be provided to a user, in part, by determining whether the content provider has indicated that augmentative content should be provided.

A content provider may indicate that augmentative content should be provided any time original content is provided from the content provider. In other embodiments, a content provider may indicate that augmentative content should be provided in response to particular requests for original content, and in further embodiments, a content provider may indicate that augmentative content should be provided when particular instances of original content are provided from the content provider.

In various embodiments of the present invention, a content provider may indicate that augmentative content should be provided by expressly informing the service provider of that indication. In other embodiments, a content provider may include an indicator with the original content. An indicator may inform a service provider that augmentative content should be provided. In some embodiments, such an indicator may include, for example, an HTML tag, a text flag, or anything else that may indicate to a service provider that augmentative content should be provided. In an embodiment, an indicator may be a script that is executable at the service provider. Such a script indicator may generate augmentative content at the server in one embodiment. In other embodiments, a script indicator may cause the server to retrieve augmentative content from an external source, or may cause the server to retrieve particular instances of augmentative content from a database within the server.

At a step 203, the service provider references click-stream data associated with the user. As mentioned above with respect to FIG. 1, click-stream data may be stored in a database. In an embodiment of the invention, click-stream data is referenced by querying a database storing the click-stream data. Such a query may, for example, be directed to retrieving click-stream data associated with a particular user that can be used in a further determination of relevant augmentative data to be provided to the user. Similarly, at step 204, profile data associated with the user is referenced. In various embodiments, as described above, profile data may be referenced by querying a database that has profile data stored therein.

At step 205, the augmentative content is determined. In an embodiment, the augmentative content to be provided is selected based on its relevance to the user. This relevance may be determined or estimated based on various attributes of the user such as those described above with reference to FIG. 1. In various embodiments of the present invention, the determination of augmentative content may also be based on the original content, the click-stream data that was referenced at step 203, and/or the profile data that was referenced at step 204.

After augmentative content is determined, the augmentative content is used to augment the original content, as shown at step 206. Original content may be augmented in any number of ways. In one embodiment, a service provider may augment original data simply by communicating augmentative data to the user separate from, but in addition to, communicating the original content to the user. In another embodiment, original content is augmented by combining the original content with the augmented content. As used herein, augmented content means original content that has been augmented with augmentative content.

As the term "combining" is used herein, augmentative content may be combined with original content, in one embodiment, by embedding the augmentative content in the original content. In another embodiment, augmentative content may be combined with original content by adding the augmentative content to the original content. In a further embodiment, augmentative content may be combined with original content by modifying the original content such as described above with reference to FIG. 1. In still a further embodiment, augmentative content may be combined with original content by replacing some or all of the original content with augmentative content. As shown at step 207 of FIG. 2, the service provider communicates the augmented content to the user.

Turning now to FIG. 3, another illustrative method according to an embodiment of the present invention is presented in flow-chart form. At a step 301, a service provider monitors network activity associated with a user. A service provider may take advantage of the transparency of a user's network activities described above with reference to FIG. 1 in order to monitor and log data relating to those network activities. At step, 302, click-stream data associated with the user is compiled such as, for example, in a database maintained at a server that is owned, managed, or operated by the service provider.

At step 303, a user request for content is intercepted. In an embodiment of the present invention, a user request for content may include a request communicated by the user to a content provider. The request may, for example, indicate that the user wishes to receive content that satisfies the request. In an embodiment, the request may include a query or search definition for effecting a search at the content provider for content that satisfies the query or search definition.

According to an embodiment of the present invention, a process of determining augmentative content to provide to the user may be commenced upon intercepting a user request for content. This process may, in one embodiment, result in a selection of augmentative content. In another embodiment, the process may be commenced but not completed until the service provider intercepts a response from the content provider, as the response may be useful in determining relevant augmentative content to provide to the user. In a further embodiment, the process of determining augmentative content may not begin at all until a response from the content provider is intercepted.

At step 304, a response from the content provider is intercepted. The response may include original content from the content provider, original reference content such as a link to content, or any number of other responses known in the art. For example, the response may indicate that the requested content is not available at the content provider. For the purposes of the exemplary method illustrated in FIG. 3, even a response indicating that requested content is unavailable may be treated as original content, because such a response may be augmented with augmentative content.

At step 305, the original content is augmented based, at least in part, on the compiled click-stream data associated with the user. As described above with reference to FIG. 1, the augmented content that is generated at step 305 of FIG. 3 may be contextually relevant to the user. For example, the augmented content may be created by combining the original content with augmentative content, where the augmentative content is selected so as to provide the user with an enriched experience that may include information that is likely to be meaningful or helpful to the user.

Figure 4:
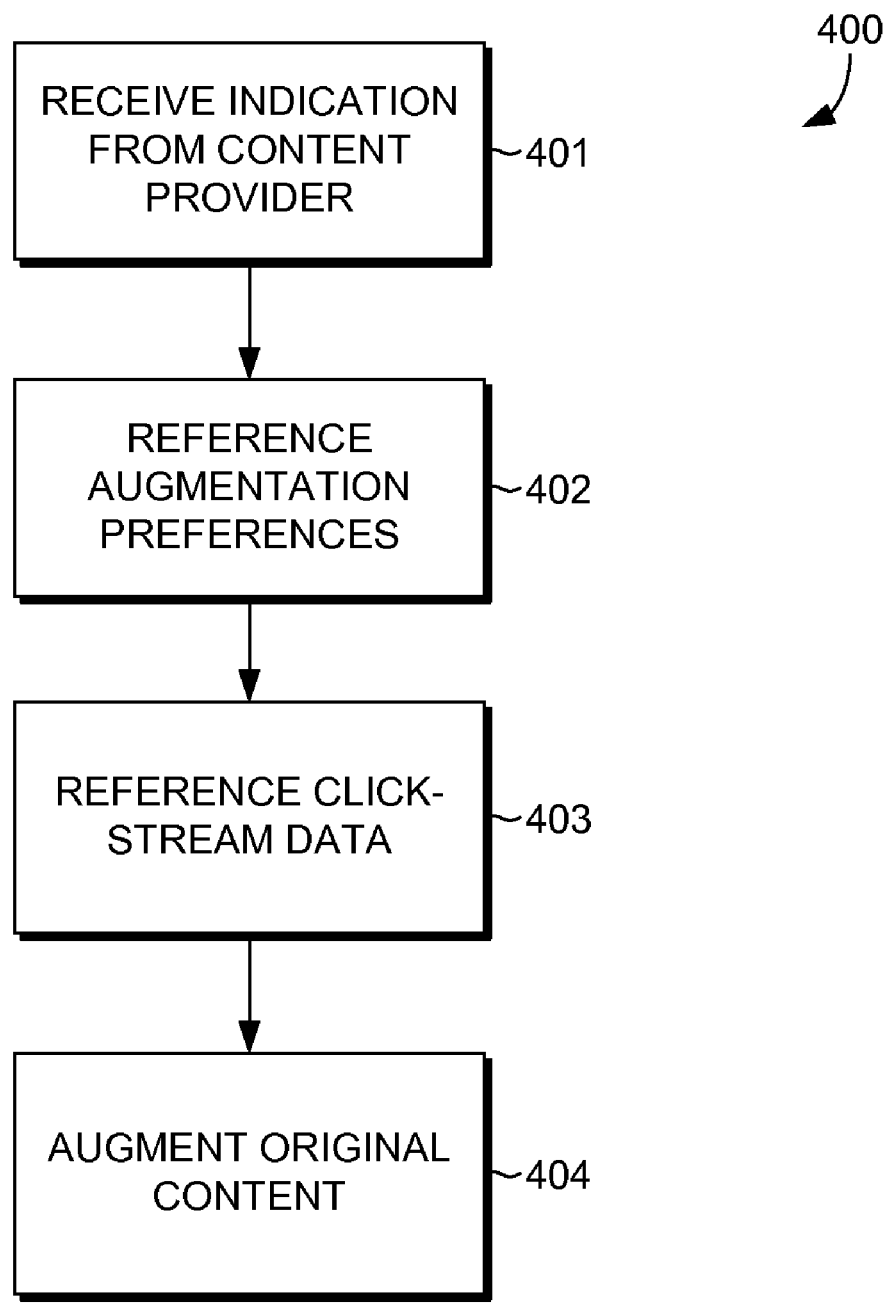
FIG. 4 is a flow diagram illustrating an exemplary method of creating augmented content that is contextually relevant to a user by augmenting content to be communicated to said user according to an embodiment of the present invention.

Turning now to FIG. 4, still another method according to an embodiment of the present invention is provided in flow-chart form. At a step 401, an indication is received from a content provider. The indication may include information indicating that the service provider should augment original content that was sent from the content provider and that is to be delivered to one or more users. In one embodiment, the indication received at step 401 may be received contemporaneously with original content from the content provider. In another embodiment, the indication may be received at some other time such as, for example, during or according to business dealings between the content provider and the service provider.

At step 402, augmentation preferences are referenced. The augmentation preferences may correspond to one or more users. In various embodiments of the present invention, the augmentation preferences may describe an extent to which content should be augmented for each respective user, as explained above with reference to FIG. 1. Similarly, at step 403, click-stream data associated with the user or users is referenced. At step 404, the original content is augmented with augmentative content. The augmentative content may be selected based, at least in part, on the indication received at step 401, the augmentation preferences referenced at step 402, and the click-stream data referenced at step 403. In various embodiments, the augmentative content may also be selected based on user profiles, current geographical location, and/or any number of other attributes associated with the user, as described above.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of augmenting content to be communicated to a user device, the method comprising:

intercepting a request for content that is communicated by a user device to a content provider, wherein intercepting the request includes making a copy of the request and transmitting the request to the content provider;

intercepting original content from the content provider, the original content being provided in response to the request from the user device;

determining augmentative content provision criteria comprising:

(A) a business rule which indicates that augmentative content should be provided in response to a particular request for original content, wherein the request is determined to be the particular request, (B) click-stream data associated with said user, wherein said click-stream data indicates at least a portion of a web-browsing history of said user, and wherein the click-stream data further indicates that the user was previously provided augmentative content and that the user interacted with the previously-provided augmentative content, and (C) profile data associated with said user, wherein the profile data comprises at least one geographical location associated with said user;

selecting said augmentative content based on a current geographical location of the user device and said augmentative content provision criteria;

augmenting the original content with the augmentative content to create augmented content; and communicating said augmented content to said user device.

2. The media of claim 1, wherein determining augmentative content provision criteria comprises determining whether the user has granted permission to provide augmentative content.

3. The media of claim 1, wherein determining augmentative content provision criteria comprises provided comprises determining whether a second business rule requires providing augmentative content when a particular instance of original content is provided from the content provider.

4. The media of claim 3, wherein the business rule and the second business rule are based on one or more requests from the content provider.

5. The media of claim 1, wherein the augmentative content is contextually relevant to the user based on attributes of the user, wherein said attributes of the user comprise at least one of:

historical geographic location of the user device; and a current geographic location of the user device.

6. The media of claim 1, wherein said click-stream data comprises having click-stream information stored in a database that is associated with the user.

7. The media of claim 1, wherein said profile data comprises a profile stored in a database that includes information associated with the user.

8. The media of claim 7, wherein said information comprises at least one of demographic information, financial information, and user preferences associated with the user device.

\* \* \* \* \*